Patented May 8, 1934

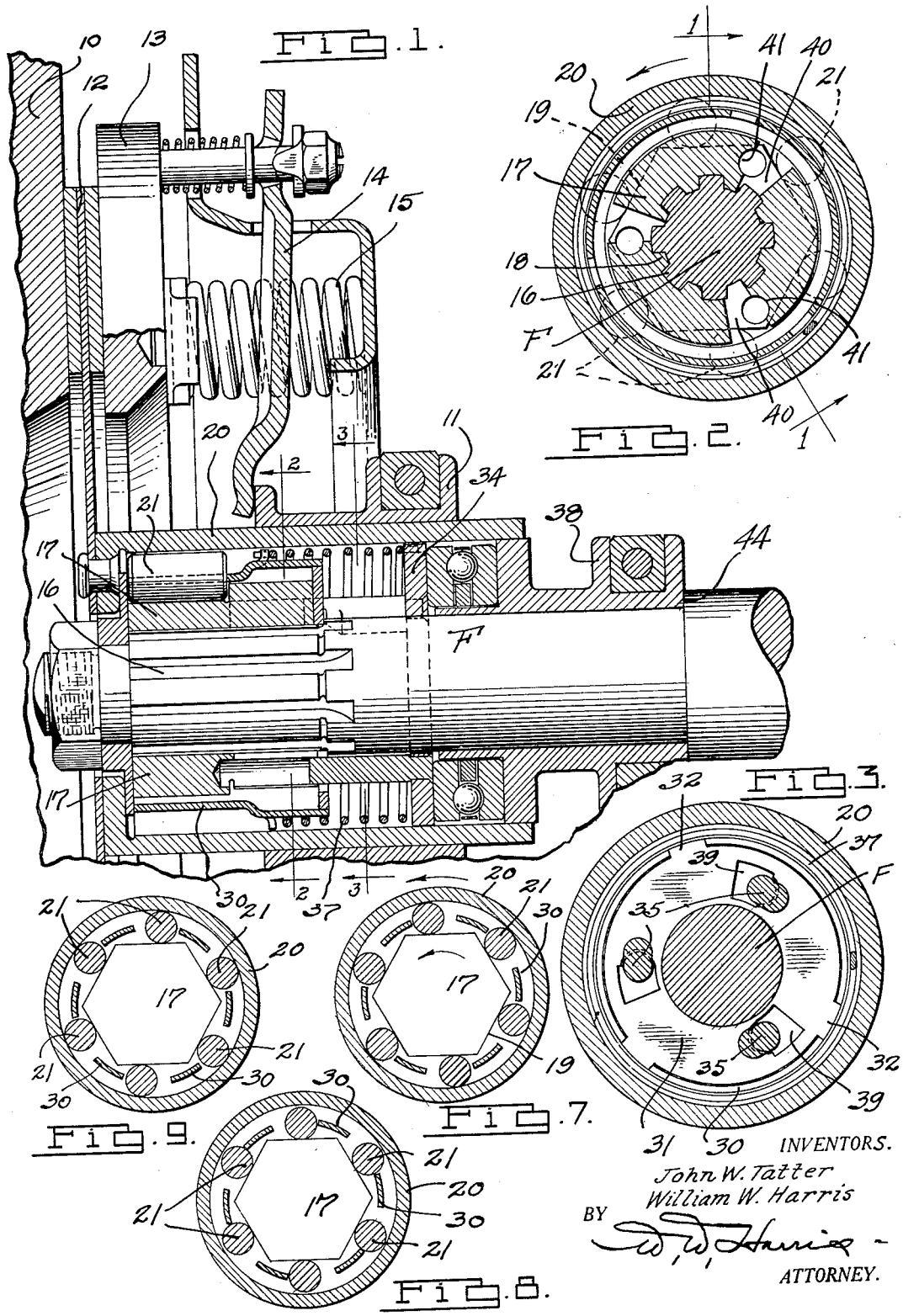

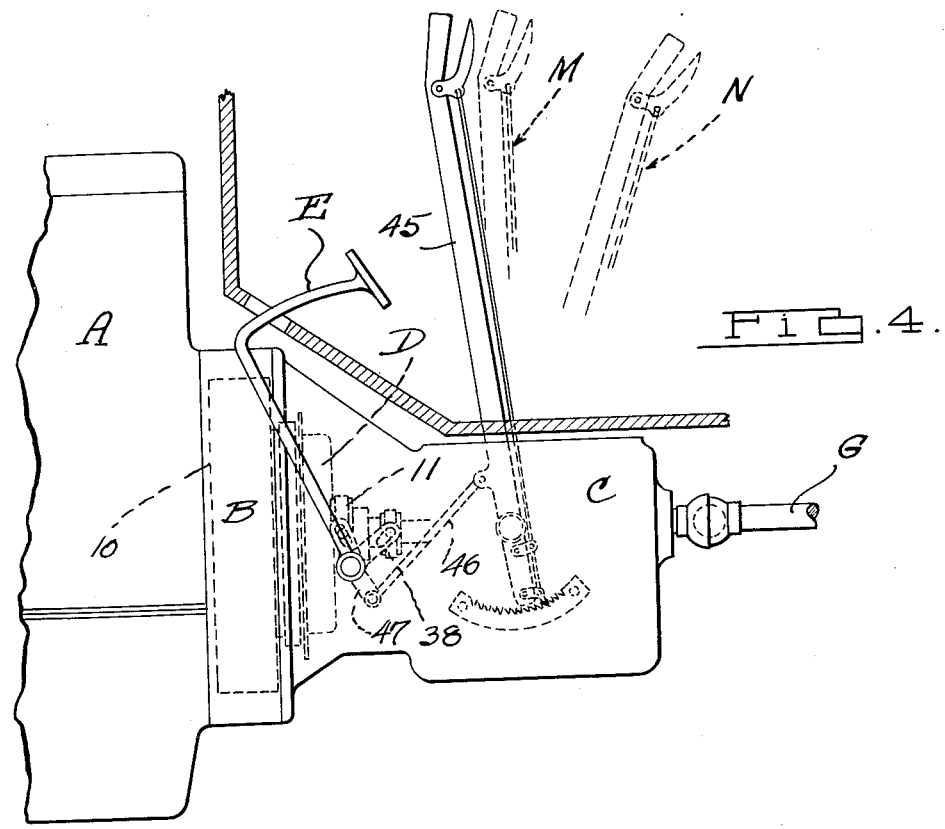
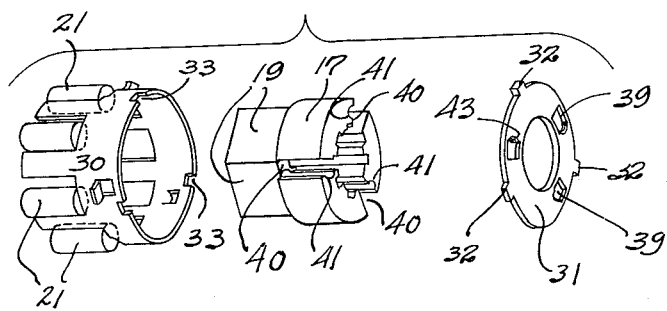
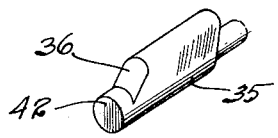
INVENTORS.
John W. Tatter
William W. Harris

1,957,500

UNITED STATES PATENT OFFICE 1,957,500

POWER TRANSMITTING DEVICE

William W. Harris and John W. Tatter, Detroit, Mich.; said Harris assignor to Continental Motors Corporation, Detroit, Mich., a corporation of Virginia Application November 14, 1930, Serial No. 495,614

16 Claims. (Cl. 192—48)

Our invention relates to engines and more particularly to a power transmitting apparatus or device adapted for assembly with an engine employed with automobiles or other self propelled vehicles of a like character.

It is a known fact that a considerable saving in operating expense of automobiles and the like may be obtained by providing a free-wheeling device that will disconnect the engine from the driven wheels at times when the wheels tend to override the engine thereby permitting the automobile or like vehicle to freely coast. Greater fuel economy is obtained and more efficient and reliable engine performance is also obtained because of the decreased wear and tear of the various engine parts.

It is an object of our invention to provide a free wheeling device adapted for assembly with an engine employed with an automobile or other like vehicles, that may be economically manufactured and readily assembled with a power transmitting apparatus associated with said engine.

A further object of our invention is to construct a compact power transmitting apparatus including a free wheeling device by providing a structure in which the clutch assembly is arranged and adapted for substantially housing the free wheeling device.

A still further object of our invention is to construct a clutch assembly adapted for housing and supporting a free wheeling device and control therefor.

For a more detailed understanding of our invention reference may be had to the accompanying drawings illustrating a preferred embodiment of the invention, and in which:

Figure 1 is a fragmentary longitudinal sectional view of a clutch assembly and free wheeling device associated therewith, Figures 2 and 3 are transverse sectional views of the free wheeling device taken substantially on the lines 2—2 and 3—3 respectively of Figure 1, Figure 4 is an elevational view of a portion of an engine and the power transmitting apparatus associated therewith, and showing the means whereby the free wheeling device may be connected with an emergency brake lever, Figure 5 is a distended view in perspective of the free wheeling control device, Figure 6 is a perspective view of the pin of the free wheeling control device, Figure 7 is a diagrammatic view illustrating the intermediate driving mechanism showing the parts in driving relation, Figure 8 is a similar diagrammatic view showing the parts in a free wheeling position, and Figure 9 is a similar diagrammatic view showing the free wheeling device in an inoperative position.

The free wheeling device in its present embodiment is preferably shown in conjunction with an internal combustion engine A provided with a flywheel 10 enclosed preferably in a flywheel housing B bolted or otherwise secured to the engine A. Adjacent to the flywheel housing and preferably secured thereto is a clutch and transmission housing C. A clutch assembly D is housed within the housing C and is preferably actuated by means of a clutch pedal E operatively connected with a clutch collar 11. The clutch D includes a driven member or clutch disc 12 adapted to be operatively connected with a driving element carried by the engine. In the illustrated embodiment of the invention the driven member of the clutch is frictionally engaged between the flywheel 10 and the pressure plate 13 of the clutch assembly, said plate being preferably driven directly by the engine flywheel through the usual driving studs (not shown). The clutch is adapted to be released in the usual way by moving the clutch collar 11, said clutch collar engaging the levers 14 which act on the pressure plate to move the same to free the driven member of the clutch against the force of the springs 15 engaged with said plate and that are constructed to yieldingly pack the disc between the pressure plate and flywheel of the engine.

A driven element or shaft F is adapted for connection with the propeller shaft G through the usual transmission (not shown) contained within the housing C. The inner end of this shaft F is splined as at 16 and the sleeve 17 is keyed to the splined end of the shaft F, said sleeve preferably being provided with internal splines 18 engaging the external splines 16 of the shaft to effect the aforesaid driving connection. A portion of the external surface of the sleeve 17 is constructed as a polygon in cross-section, and though the drawings illustrate the same as being hexagonal in shape as at 19, obviously a more or less number of faces or sides could be provided.

A driving sleeve 20 is secured to the driven member of the clutch and is preferably concentrically assembled with the sleeve 17 and spaced radially therefrom. Interposed between angularly faced portions or sides 19 of the sleeve 17 and the inner face of the outer driving sleeve 20, are a plurality of rollers 21, one roller associated with each side of the inner sleeve 17.

As the driving sleeve 20 is rotated because of its connection with the driven member of the clutch, the roller is wedged between the driving and driven sleeves 20 and 17 respectively (see Figure 7) thereby positively driving the sleeve 17 and shaft F which is secured thereto. When the speed of the vehicle, the wheels of which are operatively connected with shaft F, is faster than the engine, the sleeve 17 is rotated faster than the sleeve 20, i. e., the driven sleeve 17 and shaft F override the driving sleeve 20 and driven member 12 to which said sleeve 20 is secured. When said sleeve 17 overrides sleeve 20 the rollers 21 are released from their wedged position between the sleeves and the parts assume the position as illustrated in Figure 8, i. e., the free wheeling position. There is now no driving connection between the sleeves and the sleeve 17 and shaft F to which the sleeve 17 is secured may rotate freely with respect to the driving sleeve 20.

In order to prevent the rollers 21 from going past the midpoint of the flat faces or sides of the sleeve 17 as shown in Figure 8, we have provided a cage 30 preferably attached to an end plate 31 by the tongues and notches 32 and 33 respectively, said cage and end plate providing a cup shaped cage assembly which can have a slight relative rotational movement with respect to the shaft F and sleeve 17 secured thereto. A collar 34 is slidably supported on the shaft F and carries the pins 35, these pins being provided with a cam surface 36 adapted for engagement with the cage assembly (in particular the end plate 31) for rotating the cage with respect to the sleeve 17 against the force exerted by the coiled compression spring 37. By actuating the thrust collar 38 the collar 34 may be moved. Thus the cage is adapted for movement into the position illustrated in Figure 9, thereby permitting the rollers 21 to move past the middle point of the flattened sides of the sleeve 17 and to wedge between the sleeves adjacent the opposite edge of the flattened sides, (see Figure 9). In this latter position the sleeve 17, which is secured to the driven element or shaft F, becomes the driving sleeve and the sleeve 20 becomes the driven sleeve. Thus, the free wheeling device may be said to be locked, and the engine may thus be employed to brake the wheels on going down a long grade where the tendency is for the wheels to override the engine.

As long as the rollers are wedged in the position shown in Figure 9, they will remain so even though the pins 35 which have cammed the cage over are retracted. However, to restore the free wheeling device to an operative position, it is first necessary to retract the pins 35, this being accomplished by retracting the thrust collar 38 thereby permitting the compression spring 37 to retract the collar 34 which carries the pins 35.

The end plate 31 is provided with a plurality of elongated arcuate slots 39, said slots being long enough to receive the elongated central portion of the pins 35, and the sleeve 17 is radially slotted as at 40 to also receive the pins 35, one rounded edge of each pin adapted to be slidably guided in the groove 41 extending longitudinally of the slots 40. (See Fig. 5.) After retracting the pins the engine will sooner or later tend to override the vehicle wheels, and may be caused to do so by stepping on the accelerator, the driving sleeve 20 thus tending to override the driven sleeve, thus releasing the rollers and permitting the spring 37, which is arranged to exert a force on the cage tending to rotate the same, to return the cage to a position as shown in Figure 7 where the rollers can be wedged in position to effect a driving connection again from the driving sleeve to the driven sleeve. When the pins 35 are retracted the circular tip 42 of the pins is still engaged in the groove 41 and the semi-circular end portion 43 of the end plate engages the pin and the cage is positioned in readiness to be again cammed over by the cam portion 36 of the pins. The spring 37 serves the double function of resisting the relative rotational movement of the cage and resisting the projection of the pins into the slots 40.

The clutch collar 11 is preferably supported to slide on the outer sleeve 20 (see Fig. 1) and is preferably mounted concentrically of the sleeve 20 and the shaft F. The free wheeling construction as described above is thus positioned substantially within the clutch assembly. The thrust collar 38 which is operated to selectively throw the free wheeling device into an inoperative position is preferably slidably supported on the driven element or shaft F, said shaft being preferably provided with a shoulder 44 which limits the retracting movement of the collar and by reason of the arrangement shown, the retracting movement of the collar 34 and pins carried thereby is also limited.

Means are provided for preferably connecting the thrust collar 38 with an emergency brake lever 45, associated with the vehicle, though obviously other actuating means may be employed if so desired. The normal travel of the emergency lever is illustrated by the dotted line positions M and N (see Fig. 4) illustrating the release and locked positions respectively of said lever. However, this emergency brake lever 45 may be advanced forwardly of the released position M as indicated by the position illustrated in full lines in Figure 4, the lever being connected to the collar 38 by means of suitable links and cranks 46 and 47 respectively, so that when the lever is moved from the dotted line position M into the full line position as shown, the collar 34 and pins 35 carried thereby are advanced, thereby making the free wheeling device inoperative.

Although we have illustrated but one form of our invention and have described but a single application thereof, it will be apparent to those skilled in the art to which our invention pertains that various modifications and changes may be made therein without departing from the spirit of our invention or from the scope of the appended claims.

What we claim as our invention is:

1. In a power transmitting means, the combination of a driving element, a driven element, a clutch assembly intermediate said driving and driven elements and including a driven member adapted for operative connection with said driving element, a power transmitting device intermediate said driven member and driven element and comprising driving and driven sleeves, one of said sleeves operatively connected with the driven member of the clutch assembly and the other sleeve operatively connected with the driven element, and a reversible one-way clutch including driving connections intermediate said driving and driven sleeves releasable from a driving connection during clutch engagement when the driven element overrides the driving element, and means selectively engaged with said driving connections to reverse the action thereof to operatively connect said driving and driven sleeves when the driven element tends to override the driving element.

2. In a power transmitting means, the combination of a driving element, a driven element, a clutch assembly intermediate said driving and driven elements and including a driven member adapted for operative connection with said driving element, a reversible one-way clutch including an intermediate driving connection for operatively connecting the driven element with the driven member of said clutch assembly and substantially housed within the clutch assembly, and means for selectively locking said intermediate driving connection with said driven member when the driven element tends to override the driving element.

3. In a power transmitting means, the combination of a driving element, a driven shaft, a clutch assembly surrounding said shaft and including a driven member adapted for operative connection with the driving element, an intermediate driving structure housed within said clutch assembly and including a driving sleeve surrounding said driven shaft, said sleeve connected with the driven member of said clutch and automatically releasable with said driven shaft when said shaft overrides the driving element, and a clutch actuating collar movably supported on said sleeve.

4. In a power transmitting means, the combination of a driving element, a driven shaft, a clutch assembly surrounding said shaft and including a driven member adapted for operative connection with the driving element, an intermediate driving structure housed within said clutch assembly and including a driving sleeve surrounding said driven shaft, said sleeve connected with the driven member of said clutch and automatically releasable with said driven shaft when said shaft overrides the driving element, and a movable clutch actuating collar concentrically surrounding said sleeve.

5. In a power transmitting means, the combination of a driving element, a driven shaft, a clutch assembly surrounding said driven shaft and including a driven member adapted for operative connection with the driving element, clutch actuating means for effecting clutch engagement and disengagement, a free wheeling device substantially housed within said clutch assembly and clutch devices adapted for operative connection with the driven member of said clutch assembly and said driven shaft and means operable independently of said clutch actuating means and engaging said clutch devices to render said free wheeling device inoperative.

6. In a power transmitting means, the combination of a driving element, a driven shaft, a clutch assembly surrounding said driven shaft and including a driven member adapted for operative connection with the driving element, clutch actuating means for effecting clutch engagement or disengagement, a free wheeling device supported by said driven shaft and substantially housed within said clutch assembly, said device including clutch devices adapted for operative connection with the driven member of said clutch assembly and said driven shaft, and means slidably supported on said driven shaft and engaging said clutch devices and operable independently of said clutch actuating means to render said free wheeling device inoperative.

7. In a power transmitting means, the combination of a driving element, a driven shaft, a clutch assembly surrounding said driven shaft and including a driven member adapted for operative connection with the driving element, clutch actuating means for effecting clutch engagement or disengagement, a free wheeling device substantially housed within said clutch assembly and including clutch devices adapted for operative connection with the driven member of said clutch assembly and said driven shaft, and manually controlled means operable independently of said clutch actuating means for rendering said free wheeling device inoperative, said means engaging said clutch devices.

8. In a power transmitting means, the combination of a driving element, a driven shaft, a clutch assembly surrounding said driven shaft and including a driven member adapted for operative connection with the driving element, clutch actuating means for effecting clutch engagement or disengagement, a free wheeling device substantially housed within said clutch assembly and including roller clutch devices adapted for operative connection with the driven member of said clutch assembly and said driven shaft, and manually operated means operable independently of said clutch actuating means for selectively rendering said free wheeling device inoperative or operative, said means engaging said clutch devices.

9. In a power transmitting means, the combination of a driving element, a driven shaft, a clutch assembly intermediate said driving element and driven shaft and including a driven member adapted for operative connection with said driving element, a free wheeling device substantially housed within said clutch assembly and including driving and driven sleeves, one being operatively connected with the driven shaft and the other to the driven member of the clutch assembly, means intermediate said sleeves adapted for transmitting power from the driving sleeve to said driven sleeve, said clutch assembly including an actuating lever extending radially inwardly of said clutch assembly, and a clutch collar surrounding said free wheeling device and adapted for engagement with said lever for actuating the clutch.

10. In a power transmitting means, the combination of a driving element, a driven shaft, a clutch assembly intermediate said driving element and driven shaft and including a driven member adapted for operative connection with said driving element, a free wheeling device substantially housed within said clutch assembly and including driving and driven sleeves, one being operatively connected with the driven shaft and the other to the driven member of the clutch assembly, means intermediate said sleeves adapted for transmitting power from the driving sleeve to said driven sleeve, said clutch assembly including an actuating lever extending radially inwardly of said clutch assembly, and a clutch collar movably supported by one of the sleeves of said free wheeling device and adapted for engagement with said lever for actuating the clutch.

11. In a power transmitting means, the combination of a driving element, a driven shaft, a clutch assembly intermediate said driving element and driven shaft and including a driven member adapted for operative connection with said driving element, a free wheeling device substantially housed within said clutch assembly and including driving and driven sleeves, one being operatively connected with the driven shaft and the other to the driven member of the clutch assembly, means intermediate said sleeves adapted for transmitting power from the driving sleeve to said driven sleeve, means movably supported by said shaft and adapted for engagement with the power transmitting means intermediate the sleeves to render the free wheeling device inoperative, and a clutch actuating means movably supported externally of said sleeves.

12. In a power transmitting means, the combination of a driving element, a driven shaft, a clutch assembly intermediate said driving element and driven shaft and including a driven member adapted for operative connection with said driving element, a free wheeling device substantially housed within said clutch assembly and including driving and driven sleeves, one being operatively connected with the driven shaft and the other to the driven member of the clutch assembly, means intermediate said sleeves adapted for transmitting power from the driving sleeve to said driven sleeve, means movably supported by said shaft and adapted for engagement with the power transmitting means intermediate the sleeves to render the free wheeling device inoperative, and a clutch actuating collar slidably supported on the outer sleeve and concentrically arranged therewith.

13. In a power transmitting means adapted for association with a vehicle of the class described, a clutch assembly including clutch actuating means for effecting clutch engagement or disengagement, a free wheeling device incorporated within said clutch assembly and including a reversible one way clutch device, an emergency brake lever for said vehicle, and means operable independently of the clutch actuating means and operatively connected with the said brake lever for selectively placing said free wheeling device in an operative or inoperative position, said means engaging said reversible one way clutch device.

14. In a power transmitting means adapted for association with a vehicle of the class described, a clutch assembly including clutch actuating means for effecting clutch engagement or disengagement, a free wheeling device incorporated within said clutch assembly and including a reversible one way clutch device, and manually operated means operable independently of said clutch actuating means for selectively placing said free wheeling device in an operative or inoperative position, said means engaging said reversible one way clutch device.

15. In a power transmitting means adapted for association with a vehicle of the class described, a clutch assembly including clutch actuating means for effecting clutch engagement or disengagement, a free wheeling device substantially housed within said clutch assembly and including a reversible one-way clutch device, and manually operated means operable independently of said clutch actuating means for selectively placing said free wheeling device in an operative or inoperative position, said means engaging said reversible one way clutch device.

16. In a power transmitting means adapted for association with a vehicle of the class described having a driving element and a driven element, a clutch assembly intermediate the driving and driven elements and including clutch actuating means for effecting clutch engagement or disengagement, a free wheeling device substantially housed within said clutch assembly and provided with a driving means operatively connected with said driven element, said free wheeling device including a reversible one-way clutch structure, and means operable independently of said clutch actuating means for selectively placing said free wheeling device in an operative or inoperative position, said means engaging said reversible one way clutch structure.

WILLIAM W. HARRIS.
JOHN W. TATTER.